United States Patent [19]

Hugh

[11] 4,003,119

[45] Jan. 18, 1977

[54] PULLING DEVICE

[75] Inventor: Melvin Dong Hugh, Wilmington, Calif.

[73] Assignee: Ingersoll-Rand Company, Woodcliff Lake, N.J.

[22] Filed: Jan. 16, 1976

[21] Appl. No.: 649,851

[52] U.S. Cl. .................................................. 29/254

[51] Int. Cl.[2] .......................................... B23P 19/04

[58] Field of Search .............................. 29/254, 255

[56] References Cited

UNITED STATES PATENTS

| | | | |
|---|---|---|---|
| 1,958,330 | 5/1934 | Beard | 29/255 |
| 2,779,089 | 1/1957 | Allen | 29/254 |
| 3,336,652 | 8/1967 | Ullmo | 29/254 |
| 3,739,452 | 6/1973 | Gadberry | 29/254 |

*Primary Examiner*—James L. Jones, Jr.
*Attorney, Agent, or Firm*—Walter C. Vliet

[57] ABSTRACT

Disclosed is a gear or sleeve puller having a slide hammer which serves to function as a means of adjusting the gripping jaws in areas of limited access. The slide hammer device is equipped with adjusting collar engaging dogs whereby the operator may extend his reach of the adjusting collar. With the dogs engaged the operator merely rotates the slide hammer to rotate the adjusting collar and thereby accomplish adjustment of the engaging jaws. The slide hammer may then be manipulated in the conventional manner to remove a sleeve or similar devices.

6 Claims, 1 Drawing Figure

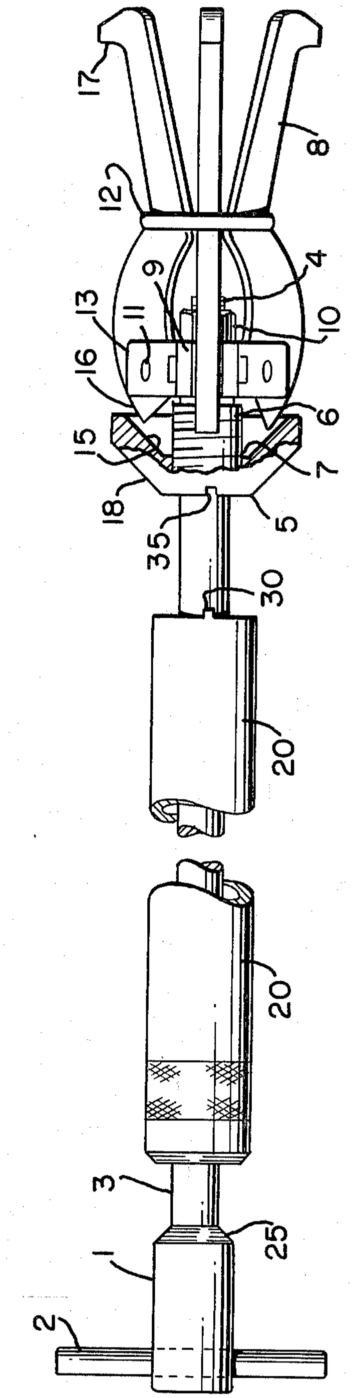
17
8
12
4
9
13
11
10
16
6
15
7
18
5
35
30
20
20
3
25
1
2

PULLING DEVICE

BACKGROUND OF THE INVENTION

In many gear puller or sleeve puller applications, access is severely limited to the gripping jaw adjusting device. In many of these applications with prior gear pullers, the operator is forced to accept partial engagement or relies upon spring biasing of the gripping jaws for contact between the gripping jaws and the articles to be removed. Thus, much of the reliability of a precise positive screw adjustment is lost and jaw faces or the part to be removed are marred. One of the most difficult of these applications is the removal of internal sleeves or bushings from rollers or hollow pipes. This is especially true where the diameter of the rollers or pipe is insufficient for hand access.

SUMMARY OF THE INVENTION

I have invented a means of remotely operating the gripping jaw adjusting screw which is simple, reliable, and easy to manufacture, and which is especially adaptable to a conventional slide hammer type of gear puller. Specifically, the invention takes advantage of the extended length of the slide hammer to increase operator's reach of the jaw adjustment. This is accomplished by placing an engagement dog on the rotatable slide hammer and providing the jaw adjusting means with a corresponding engagement surface.

The object of the invention is to provide a means for adjusting the gripping jaws of a slide hammer puller where access to the adjusting means is restricted. It is a further object of this invention to provide such access without increasing the complication of the adjusting mechanism. It is a further object to provide an adjusting means that is reliable in use and economical to manufacture. These and other objects are accomplished in a gear puller comprising: Adjustable gripping jaws; adjustment means for the jaws; impacting means for imparting an impact to the jaws; and coupling means between the adjustment means and the impacting means whereby the impacting means operates the adjustment means.

BRIEF DESCRIPTION OF THE DRAWINGS

FIG. 1 is an elevation view of the gear puller of this invention.

DESCRIPTION OF THE PREFERRED EMBODIMENT

FIG. 1 shows a slide hammer puller incorporating the feature of this invention. A mandral 1 is shown having a Tee handle 2, a slide shank 3, and a threaded mounting end 4. A spider yoke 9 is provided with an internal threaded bore (not shown) by which the spider yoke is screwed on the mounting end 4. A jam nut 10 is utilized to secure the spider yoke from rotating on the threads. The spider yoke 9 has radially projecting arms 13. On each arm is mounted a gripping jaw 8. The spider yoke 9 is also provided with an external thread 6 which operatively cooperates with and by way of which a slotted nut adjusting cone 5 is mounted. The external thread 6 extends for a substantial distance to allow for a range of movement of the adjusting cone. This in turn provides for adjustment of the gripping jaws 8.

The gripping jaws 8 are secured to the spider yoke 9 by means of pivot pins 11. The construction of the nut adjusting cone and the gripping jaws is relatively conventional and should be readily understood by those skilled in the art. A jaw activating spring 12 is utilized to return the gripping jaws to their inner most position as shown in FIG. 1. A circular coil spring is usually utilized for this purpose although any elastic device will suffice. The slotted nut adjusting cone is provided with a jaw contacting internal conical section 15 which engages an outer surface 16 of the gripping jaws.

It can be seen by one skilled in the art that as the slotted nut adjusting cone is rotated about the external thread 6 in a clockwise direction, it will advance the jaw contacting internal conical section 15 to engage the jaw outer surface 16. This will cause the gripping jaws 8 to rotate about the pivot pins 11 and to expand against the jaw activating spring 12. Thus, the gripping jaws will increase in diameter within their range of expansion. Rotating the slotted nut adjusting cone counterclockwise retracts the jaw contacting internal conical section 15 and thereby allows the jaws to be rotated by the jaw activating spring 12 to their closed position.

The construction of the preferred embodiment also provides for the reversal of the gripping jaws and the slotted nut adjusting cone. This is readily accomplished by removing jam nut 10 and the spider yoke 9. The jaw activating spring 12 and the gripping jaw pivot pins 11 must be removed to allow the gripping jaws to be reversed so that the jaw faces 17 will be extended inwardly as opposed to outwardly for the internal pulling configuration. With the spider yoke 9 removed, the slotted nut adjusting cone is removed and reversed so that the external conical surface 18 faces the outer surface 16 of the gripping jaws which will now be facing inwardly. Advancing of the adjusting cone towards the gripping jaws will now cause the gripping jaws to be forced together for external gripping of gears, bushings or the like. The operation is similar to the internal operation which will now be described.

The apparatus thus far described is relatively conventional, and its use and operation is well understood by those skilled in the art of gear pullers.

In normal operation, such gear pullers are inserted into operating position with the gripping jaws collapsed, in the case of an internal puller, and the adjusting cone is then rotated to expand the gripping jaws to contact the sleeve bearing or other device to be pulled. With most slide hammer pullers, the operator has to release the slide hammer 20 while he reaches for the adjusting cone nut 5. This creates an awkward working tool due to the imbalance of the slide hammer floating on the slide rod. Once the gripping jaws 8 are in contact with the device to be pulled, the slide hammer 20, which is an axially slidable weight device disposed on the slide shank at a reduced diameter portion thereof, is activated. It can be seen that rapid movement of the slide hammer axially to the Tee handle will result in a blow being delivered to the mandral as the slide hammer impacts on the expanded portion of the mandral 25 near the Tee handle 2. The resulting blow will be transmitted to the gripping jaws via the mandral, slide shank, spider, and pivot pins. The gripping jaws in turn will impart the blow to the device being removed. Operation of the slide hammer may be repeated numerous times until the device is removed.

I have invented a means of rotating the nut adjusting cone 5 in areas of restricted access by providing an engaging means on both the slide hammer and the nut adjusting cone. In the case of the preferred embodiment shown, the engaging means of the slide hammer is a male dog member 30 which cooperates with a female slot 35 in the adjusting cone. When the slide hammer 20 is moved axially in a direction to engage the adjusting cone, the male dog member 30 may cooperate with the female slot 35 and thereupon the rotation of slide hammer in an appropriate direction will rotate the slotted nut adjusting cone 5. By this simple means, the operator may extend his reach to the slotted nut adjusting cone by the length of the slide hammer. The tool can be utilized in any position and the operator retains balance and grip on the tool at all times. He does not have to change hands at any time during use to adjust the gripping jaws.

In addition, in the prior art it is customary to provide the nut adjusting cone with a knurled outer surface. In the case of larger pullers, the diameter of the slotted nut adjusting cone is such as to make gripping inconvenient. In addition, due to the large size of the slotted nut adjusting cone, the axial extent of knurling was limited for weight reasons. In the present invention, knurling may be omitted from the slotted nut adjusting cone and placed in turn on the slotted hammer where it serves a double function; that is, an improved grip of the slide hammer for impact purposes and for rotation adjustment.

It should now be obvious to one skilled in the art and a part of my teaching that any convenient means such as gear teeth or pins and hole may be utilized as a means of engaging the slide hammer with the nut adjusting cone. I have chosen the male dog member and slot because of their simplicity and ease of manufacture. In my preferred embodiment, the slide hammer is provided with two 180 degree opposed male dog members and the slotted nut adjusting cone is provided with a corresponding slot. A greater number of dog members or slots may be used as deemed desirable. Both the internal conical surface side and the external conical surface side of the slotted nut adjusting cone may be provided with engaging surfaces for the slide hammer dogs. This will allow rotation of the nut adjusting cone in both the internal and external configuration by means of the slide hammer.

I do not wish to be limited in the scope of my invention except by the scope of the claims.

I claim:

1. A pulling device comprising:
- a mandrel having a handle for gripping said pulling device;
- a gripping jaw mounting means securely fastened to one end of said mandrel;
- adjustable gripping jaws mounted on said gripping jaw mounting means;
- adjustment means for said jaws threadably mounted for rotation on said mandrel;
- impacting means slidably mounted on said mandrel for imparting an impact to said mandrel; and
- coupling means between said adjustment means and said impacting means whereby rotation of said impacting means relative to said mandrel operates said adjustment means.

2. The pulling device of claim 1 wherein: said impacting means is a slide hammer.

3. The pulling device of claim 1 wherein: said adjustment means is a rotatable cone collar.

4. The pulling device of claim 1 wherein:
- said impacting means is provided with an impact surface at one end and a coupling means at its other end.

5. The pulling device of claim 4 wherein:
- said coupling means is a dog projection which mates with a cooperating surface on said adjusting means whereby a rotation of said impacting means is transmitted. to said adjusting means.

6. The pulling device of claim 1 wherein:
- said adjustment means is a reversible cone collar having coupling means on both the internal and external cone ends for mating with said impacting means.

* * * * *